United States Patent
Tchervenkov et al.

(10) Patent No.: US 9,139,081 B2
(45) Date of Patent: Sep. 22, 2015

(54) WHEEL ASSEMBLY DEFINING A MOTOR/GENERATOR

(76) Inventors: Jean I. Tchervenkov, Brossard (CA);
Sylvain Crevier, Brossard (CA);
Stephane Grenier, Longueil (CA)

( * ) Notice: Subject to any disclaimer, the term of this patent is extended or adjusted under 35 U.S.C. 154(b) by 37 days.

(21) Appl. No.: 14/232,404

(22) PCT Filed: Jul. 13, 2012

(86) PCT No.: PCT/CA2012/000673
§ 371 (c)(1),
(2), (4) Date: Apr. 23, 2014

(87) PCT Pub. No.: WO2013/006962
PCT Pub. Date: Jan. 17, 2013

(65) Prior Publication Data
US 2014/0225550 A1   Aug. 14, 2014

Related U.S. Application Data

(60) Provisional application No. 61/507,880, filed on Jul. 14, 2011.

(51) Int. Cl.
*B60K 7/00* (2006.01)
*H02K 16/04* (2006.01)
(Continued)

(52) U.S. Cl.
CPC ............. *B60K 7/0007* (2013.01); *B60B 21/00* (2013.01); *B60L 11/18* (2013.01); *H02K 3/28* (2013.01);
(Continued)

(58) Field of Classification Search
CPC ...... B60K 8/00; B60N 2/0232; B60N 2/2352; B60N 2002/0236; B60N 2/225; B60N 2/2251; B60N 2/2254; F04D 25/082; F04D 29/329; H02P 23/0077; H02P 25/08; H02P 6/001; H02P 6/085
USPC ............... 318/139, 473, 254; 310/67 R, 112, 310/156.53, 226
See application file for complete search history.

(56) References Cited

U.S. PATENT DOCUMENTS 6,002,192 A    12/1999  Krivospitski et al.
2,004,021 A1   2/2004   Maslov
(Continued)

FOREIGN PATENT DOCUMENTS

CN    201781389 Y    3/2011
GB      2459062     10/2009
(Continued)

OTHER PUBLICATIONS

"Make Your Own Miniature Electric Hub Motor" from www.instructables.com,—Document pdf—32 pages—Jan. 29, 2010.
(Continued)

*Primary Examiner* — Paul Ip
(74) *Attorney, Agent, or Firm* — Benoit & Cote Inc.

(57) ABSTRACT

The present document describes a wheel assembly defining a motor/generator. The wheel assembly comprises a plurality of stator units coaxially provided within a rotor. The stator units comprise a plurality of spokes co-centrically provided around a hub/shaft and a coil provided around at least a portion of the spokes for generating an electrical field. The rotor comprises a plurality of magnets provided on an inner periphery of the rotor facing the spokes. The rotor is rotatably attached to the hub/shaft of the stator for rotating around the stator units when the coils are activated. The coils and/or the stator units may be selectively activated and deactivated to avoid overheating.

20 Claims, 7 Drawing Sheets

(51) Int. Cl.
  *H02K 11/00* (2006.01)
  *H02P 29/00* (2006.01)
  *H02K 21/22* (2006.01)
  *H02K 7/14* (2006.01)
  *B60B 21/00* (2006.01)
  *B60L 11/18* (2006.01)
  *H02K 3/28* (2006.01)

(52) U.S. Cl.
  CPC .............. *H02K 7/14* (2013.01); *H02K 11/0073* (2013.01); *H02K 21/22* (2013.01); *H02P 29/0044* (2013.01); *B60K 2007/0092* (2013.01); *B60L 2220/44* (2013.01); *H02K 11/0047* (2013.01); *H02K 16/04* (2013.01); *H02K 2213/06* (2013.01); *H02K 2213/09* (2013.01); *H02K 2213/12* (2013.01); *Y02T 10/641* (2013.01); *Y02T 10/7005* (2013.01)

(56) References Cited

U.S. PATENT DOCUMENTS

| | | | |
|---|---|---|---|
| 2,004,084 A1 | 5/2004 | Heinen | |
| 6,787,951 B2* | 9/2004 | Maslov et al. | 310/67 R |
| 6,995,494 B2* | 2/2006 | Haugan et al. | 310/268 |
| 2,006,055 A1 | 3/2006 | Walker | |
| 7,042,121 B2* | 5/2006 | De Filippis et al. | 310/63 |
| 7,196,446 B2* | 3/2007 | Hans | 310/156.53 |
| 7,453,176 B2* | 11/2008 | Davison | 310/75 R |
| 7,671,509 B2* | 3/2010 | Scott et al. | 310/266 |
| 7,687,943 B2* | 3/2010 | Lunde | 310/15 |
| 7,906,885 B2* | 3/2011 | Lu | 310/216.079 |
| RE43,232 E* | 3/2012 | Pyntikov et al. | 180/220 |
| 8,222,787 B2* | 7/2012 | El-Refaie et al. | 310/156.53 |
| 8,304,949 B2* | 11/2012 | Yamamoto | 310/156.38 |
| 8,358,046 B2* | 1/2013 | Platon | 310/266 |
| 8,421,301 B2* | 4/2013 | Hsu et al. | 310/254.1 |
| 8,476,794 B2* | 7/2013 | Amutham | 310/68 B |
| 2003/0159866 A1* | 8/2003 | Claypole et al. | 180/65.5 |
| 2003/0193250 A1* | 10/2003 | Maslov et al. | 310/68 R |
| 2004/0212259 A1* | 10/2004 | Gould | 310/67 R |
| 2004/0212266 A1* | 10/2004 | Hans | 310/156.56 |
| 2004/0263099 A1* | 12/2004 | Maslov et al. | 318/254 |
| 2005/0001503 A1* | 1/2005 | Hans | 310/156.53 |
| 2005/0045392 A1* | 3/2005 | Maslov et al. | 180/65.5 |
| 2005/0052080 A1* | 3/2005 | Maslov et al. | 307/10.1 |
| 2005/0104470 A1* | 5/2005 | Perkins et al. | 310/254 |
| 2006/0022529 A1* | 2/2006 | De Filippis et al. | 310/58 |
| 2006/0033392 A1* | 2/2006 | Ritchey | 310/112 |
| 2006/0055261 A1* | 3/2006 | Walker | 310/112 |
| 2006/0232154 A1* | 10/2006 | Shkondin | 310/148 |
| 2007/0029888 A1* | 2/2007 | Schuler et al. | 310/112 |
| 2007/0029893 A1* | 2/2007 | Schuler et al. | 310/239 |
| 2007/0063595 A1* | 3/2007 | Habibi et al. | 310/67 A |
| 2008/0093955 A1* | 4/2008 | Lunde | 310/67 A |
| 2008/0174211 A1* | 7/2008 | Liu | 310/67 R |
| 2008/0193275 A1* | 8/2008 | De Filippis et al. | 415/10 |
| 2010/0282528 A1* | 11/2010 | Palti | 180/65.1 |
| 2010/0289370 A1* | 11/2010 | Roth et al. | 310/156.53 |
| 2010/0301712 A1* | 12/2010 | Amutham | 310/68 B |
| 2011/0050138 A1* | 3/2011 | Li et al. | 318/400.27 |
| 2013/0241324 A1* | 9/2013 | Mader et al. | 310/45 |
| 2013/0241338 A1* | 9/2013 | Mader et al. | 310/156.21 |

FOREIGN PATENT DOCUMENTS

| | | |
|---|---|---|
| GB | 2462940 | 3/2010 |
| WO | WO 2004073157 A | 8/2004 |

OTHER PUBLICATIONS

Blazejczyk T., Application of permanent magnets with multi-directional magnetization in magnetoelectric disc motor, Electrotechnical Institute, Department of Electric Machines, ul. Pożaryskiego 28, 04-703 Warszawa, 2004.

Kinetic Art & Technology, Introduction to SEMA Motor Technology Jun. 2005.

McKeever J. W., Su G. J., Ott G. W. Jr., Samons K., Developing transmission-less inverter drive systems for axial-GAP permanent magnet accessory and traction motors and generators; Engineering Technology Division, Phase II CRADA ORNL 99-0568 Report, 1999.

PCT/International Search Report (ISR)—PCT/CA2012/000673 (Form PCT/ISA/210)—Sep. 5, 2012—3 pages.

Supplementary European Search Report for EP 12810733, May 15, 2015.

* cited by examiner

WHEEL ASSEMBLY DEFINING A MOTOR/GENERATOR

CROSS REFERENCE TO RELATED APPLICATIONS

This application claims priority to international Patent application No. PCT/CA2012/000673 filed on Jul. 13, 2012, which claims priority to U.S. Patent application No. 61/507,880 filed on Jul. 14, 2011.

BACKGROUND (a) Field

The subject matter disclosed generally relates to vehicles using electric motors. More particularly, the subject matter relates to an electric motor embedded in a wheel.

(b) Related Prior Art

Internal combustion engines, particularly those of the reciprocating piston type, currently propel most vehicles. Such engines are relatively efficient, compact, lightweight, and inexpensive mechanisms by which to convert highly concentrated energy in the form of fuel into useful mechanical power. The primary problem with conventional gasoline or diesel combustion engines is that they require fossil fuels that are not renewable and contribute to pollution. Consequently, a fuel that is renewable and does not contribute to pollution is desirable.

One alternative to combustion vehicles is hybrid vehicles. Hybrid vehicles include an electrical power source in addition to the internal combustion engine. In particular, the hybrid vehicle may include a gasoline engine, fuel tank, electric motor, batteries, transmission, and electric generator. Various approaches to combining the electrical power source and the internal combustion engine are known, such as a parallel hybrid in which the engine and electric motor can both simultaneously drive the transmission and the series hybrid in which the engine drives the electric generator which charges the batteries or powers the electric motor to drive the transmission.

Some hybrid vehicles are configured to allow connecting the vehicle to an external electric power supply, that is, the hybrid vehicle may be plugged in for charging. There are also battery electric vehicles that are fully powered by the electrical power source. The battery electric vehicle is configured to allow connecting the vehicle to an external power supply, that is, the battery electric vehicle may be plugged in for charging.

Each of the above vehicles use a central engine/motor and requires a transmission in order to transmit the rotation power from the engine/motor to the wheels.

A typical mechanical transmission for fuel powered vehicles allows some freedom in engine operation, usually through alternate selection of five or six different drive ratios, a neutral selection that allows the engine to operate accessories with the vehicle stationary, and clutches or a torque converter for smooth transitions between driving ratios and to start the vehicle from rest with the engine turning. Transmission gear selection typically allows power from the engine to be delivered to the rest of the drive system with a ratio of torque multiplication and speed reduction.

No transmission system is ever completely efficient and there is always a percentage of energy lost in friction in the axle, gearing, clutch and the like, especially when the vehicle is equipped with an all wheel traction mechanism (AWD).

Another problem associated with conventional vehicles is that substantial amount of the car's weight and storage space is taken for the engine/motor and the transmission system, not to mention the maintenance and replacement parts which are provided in large numbers in each vehicle.

Therefore there is a need for vehicle traction system which is independent of conventional transmission systems.

SUMMARY

According to an aspect, there is provided a vehicle comprising:
  a chassis;
  a power source;
  at least one wheel assembly attached to the chassis, the wheel assembly comprising:
    two or more wheel shaped stator units, each stator unit may be having a plurality of spokes co-centrically provided around a hub/shaft, the hub/shaft being attached to chassis of the vehicle;
    a coil wrapped around at least some of the spokes for generating a magnetic field;
    a wheel shaped rotor adapted to receive the stator units therein, the rotor may be rotatably attached to the hub/shaft and comprising a plurality of magnets provided on an inner periphery of the rotor facing the spokes, wherein the magnets are arranged so that adjacent magnet poles have opposite magnetic polarities;
  a driver control unit for receiving driving commands;
  a computer operably connected to the driver control unit for controlling an intensity of an electric current fed into the coils in accordance with the driving commands, the computer may be adapted to control operation of the coils to selectively activate idle coils and deactivate activated coils to avoid overheating;
wherein interaction between magnetic fields generated by the coils and magnetic fields generated by the magnets cause the rotor to rotate around the stator.

In an embodiment, the coils may be controlled on a stator unit level, and all coils of the same stator unit may be activated or deactivated simultaneously to avoid overheating.

In another embodiment, each coil may be controlled separately, and selected coils of different stator units may operate at the same time to avoid overheating.

In another embodiment, a space may exist between adjacent stator units.

In another embodiment, the stator units may have different magnetic capacities.

In another embodiment, the power source may include one or more of: a battery, a solar panel, and a generator connected to a combustion engine.

In another embodiment, a spacing may exist between the stator and the magnets of the rotor.

In another embodiment, the magnets may be permanent magnets.

In another embodiment, the magnets may be made of rare earth materials.

In another embodiment, the magnets may include neodymium magnets.

According to another aspect there is provided a wheel assembly for connecting to a vehicle, the wheel assembly may be comprising:
  two or more wheel shaped stator units, each stator unit may be having a plurality of spokes co-centrically provided around a hub/shaft, the hub/shaft for attaching to a chassis of the vehicle;
  a coil wrapped around at least some of the spokes for generating a magnetic field in response to an electric current fed in the coil;

a wheel shaped rotor adapted to receive the stator units therein, the rotor being rotatably attached to the hub/shaft and comprising a plurality of magnets provided on an inner periphery of the rotor facing the spokes, wherein the magnets are arranged so that adjacent magnet poles have opposite magnetic polarities, whereby magnetic fields generated by the coils and magnetic fields generated by the magnets cause the rotor to rotate around the stator;

wherein each stator unit may include a separate electrical wiring for activating and deactivating selected stator units.

In another embodiment, the coils in a single stator unit are wired together so that the coils are activated or deactivated simultaneously.

In another embodiment, the coils in a single stator unit may be wired together so that the coils are activated or deactivated simultaneously.

In another embodiment, each coil may have a separate wiring and selected coils of different stator units may be operate at the same time.

In another embodiment, a space may exist between adjacent stator units.

In another embodiment, the stator units may have different magnetic capacities.

In another embodiment, a space may exist between the stator and the magnets of the rotor.

In another embodiment, magnets may include one of: permanent magnets, rare earth magnets, and neodymium magnets.

According to another aspect there is provided a method for generating electricity, the method comprising:

installing two or more wheel shaped stator units co-axially in a wheel shaped rotor adapted to receive the stator units therein, wherein each stator unit may have a plurality of spokes co-centrically provided around a hub/shaft and a coil provided around at least a portion of the spokes, and wherein the rotor comprises a plurality of magnets provided on an inner periphery of the rotor facing the spokes, the magnets may be arranged so that adjacent magnet poles have opposite magnetic polarities;

wiring each stator unit separately;

rotating the rotor around the stator to create an electric current in the coil;

collecting the electric current from a first stator unit; switching the collection of electric current from a first set of coils to a second set of coils to avoid overheating in the first set of coils.

In an embodiment, rotating the rotor may comprise connecting the rotor to one of windmill and hydro-electric turbine.

In another embodiment, rotating rotor may comprise performing an electromagnetic breaking in a vehicle.

Features and advantages of the subject matter hereof will become more apparent in light of the following detailed description of selected embodiments, as illustrated in the accompanying figures. As will be realized, the subject matter disclosed and claimed is capable of modifications in various respects, all without departing from the scope of the claims. Accordingly, the drawings and the description are to be regarded as illustrative in nature, and not as restrictive and the full scope of the subject matter is set forth in the claims.

BRIEF DESCRIPTION OF THE DRAWINGS

Further features and advantages of the present disclosure will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENTS

The present document describes a wheel assembly defining a motor/generator. The wheel assembly comprises a plurality of stator units coaxially provided within a rotor. The stator units comprise a plurality of spokes co-centrically provided around a hub/shaft and a coil provided around at least a portion of the spokes for generating an electrical field. The rotor comprises a plurality of magnets provided on an inner periphery of the rotor facing the spokes. The rotor is rotatably attached to the hub/shaft of the stator for rotating around the stator units when the coils are activated. The coils and/or the stator units may be selectively activated and deactivated to avoid overheating.

Figure 1:
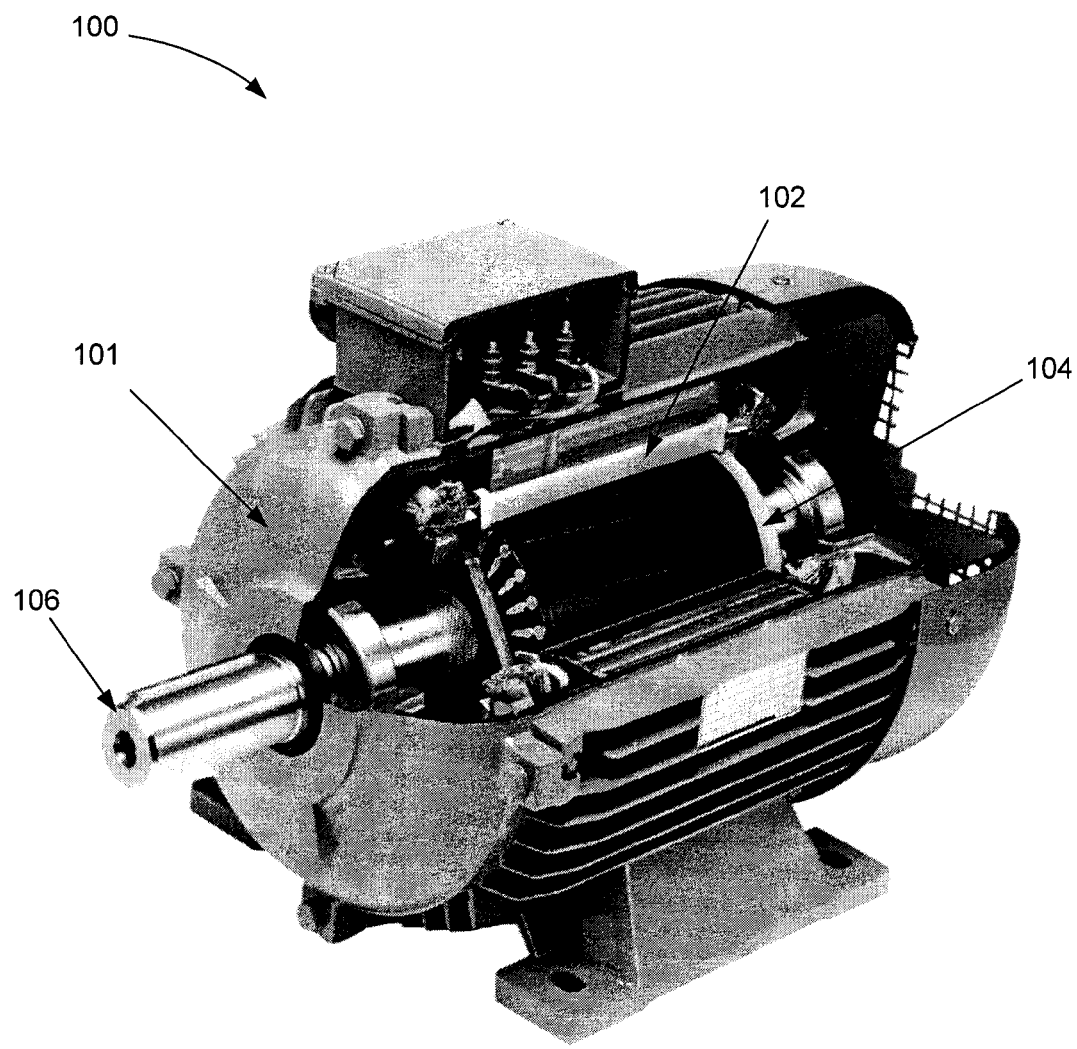
FIG. 1 illustrates an example of a conventional electric motor in which the rotor rotates within the stator.

Conventional electric motors include a stator comprising a plurality of coils for generating an electromagnetic field, and a rotor coaxial with and surrounded by the stator. FIG. 1 illustrates an example of a conventional electric motor in which the rotor rotates within the stator. As shown in FIG. 1, the motor 100 includes a chassis 101, a stator 102 fixed to the chassis 101, and a rotor 104 that rotates within the stator 102. The rotor 104 includes a shaft 106 mounted to the chassis 101 of the motor by a bearing or the like, whereby, when the motor is turned on, the coils of the stator generate an electromagnetic field which causes the rotor 104 to rotate within the stator 102. The shaft 106 of the rotor may be connected to other mechanical parts that require rotation such as pump, fan or the like. Due to their shapes and configurations, such motors cannot be used to rotate a wheel without implicating a transmission system.

Figure 2:
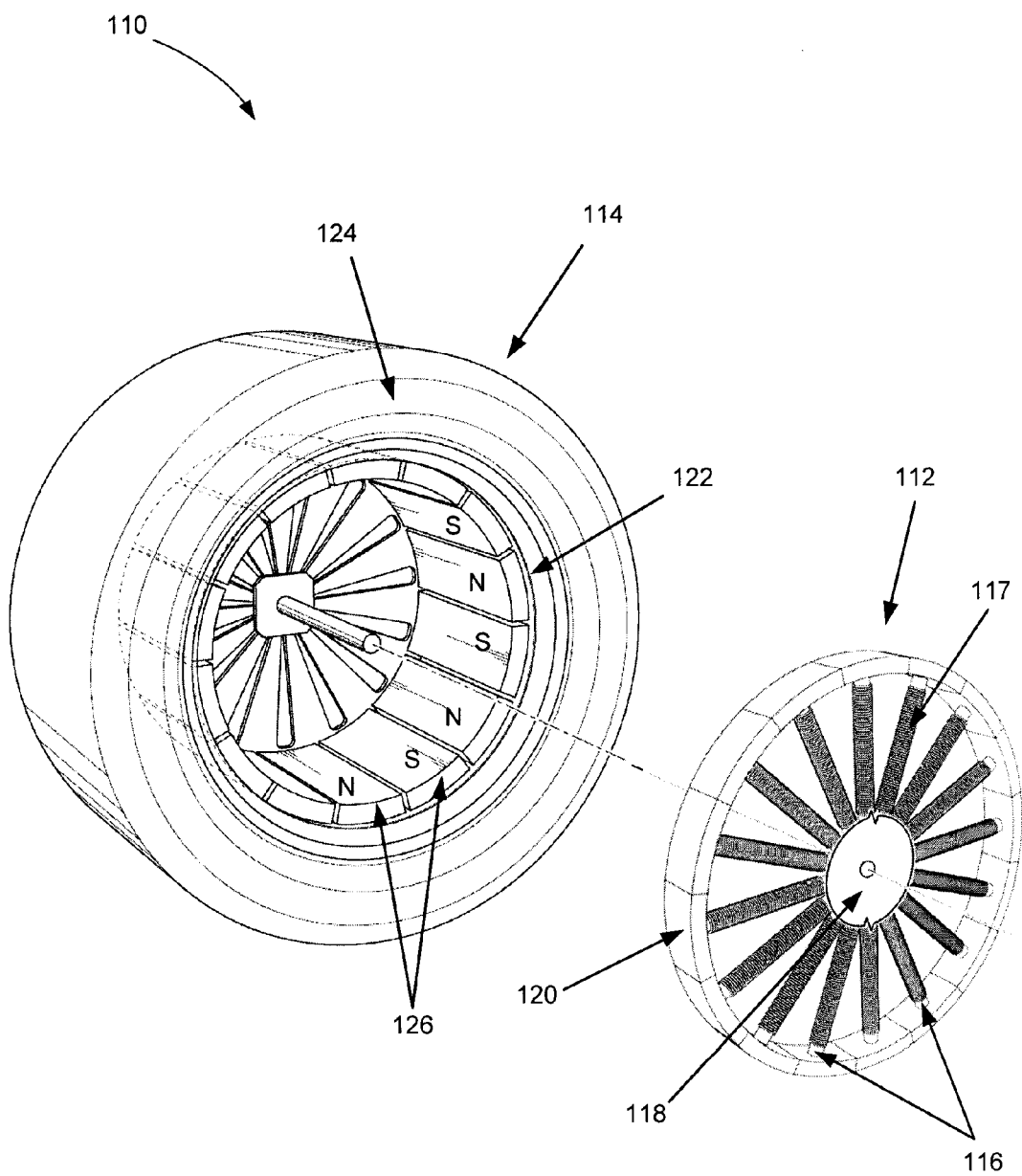
FIG. 2 illustrates an exploded view of exemplary wheel assembly in accordance with an embodiment.

Embodiments of the invention describe a wheel assembly comprising an electrical motor embedded therein, whereby, it is possible to use such wheel in a vehicle without a transmission. FIG. 2 illustrates an exploded view of an exemplary wheel assembly in accordance with an embodiment. As shown in FIG. 2, the wheel assembly 110 comprises a wheel shaped stator 112 (aka stator unit 112) and a wheel shaped rotor 114. The rotor 114 and the stator 112 are dimensioned so that the stator 112 may be co-axially received within the rotor 114 and rotatably attached to the latter, whereby the rotor 114 may rotate around the stator 112 when the wheel assembly is in operation.

The stator 112 comprises a plurality of spokes 116 co-centrically provided around a shaft/hub 118. The hub 118 may be attached to the chassis of the vehicle. As shown in FIG. 2, an electromagnetic coil 117 is provided around each spoke/spoke 116 for creating a magnetic field across the exterior surface 120 of the stator 112.

Spacing may be provided between the stator 112 and the rotor 114 to avoid friction and heating.

The rotor 114 comprises a rim 122 and optionally a rubber tire 124 around the rim 122. As shown in FIG. 2, the rotor 114 comprises a plurality of magnets 126 (e.g. permanent magnets, rare earth magnets, neodymium magnets) provided on the inner side thereof. In an embodiment, the magnets 126 are arranged beside each other so that adjacent magnet poles have opposite polarities e.g. north, south, north, south, etc. as shown in FIG. 2. The rotor 114 may be rotatably connected to the stator 112 using a bearing or the like whereby, when the stator is installed within the rotor and an electric current is provided in the windings, a magnetic field is generated by the winding/coils 117 which causes the rotor 114 to rotate around the stator 112, thereby moving the vehicle to which the stator 112 is attached.

Accordingly, in a wheel assembly 110 in accordance with the present embodiments, the stator 112 is fixedly attached to a shaft 118 and/or to the chassis of the vehicle on which the wheel assembly 110 is to be mounted. By contrast, the rim 122/wheel 124 is rotatably connected to the shaft 17 using a bearing or any similar arrangement. In operation, the different coils 117 of the stator 112 generate an electromagnetic field which pushes and/or pulls the different magnets 126 on the inner side of the rotor 114 and cause the rotor 114 to rotate around the rotation shaft 118.

Figure 3:
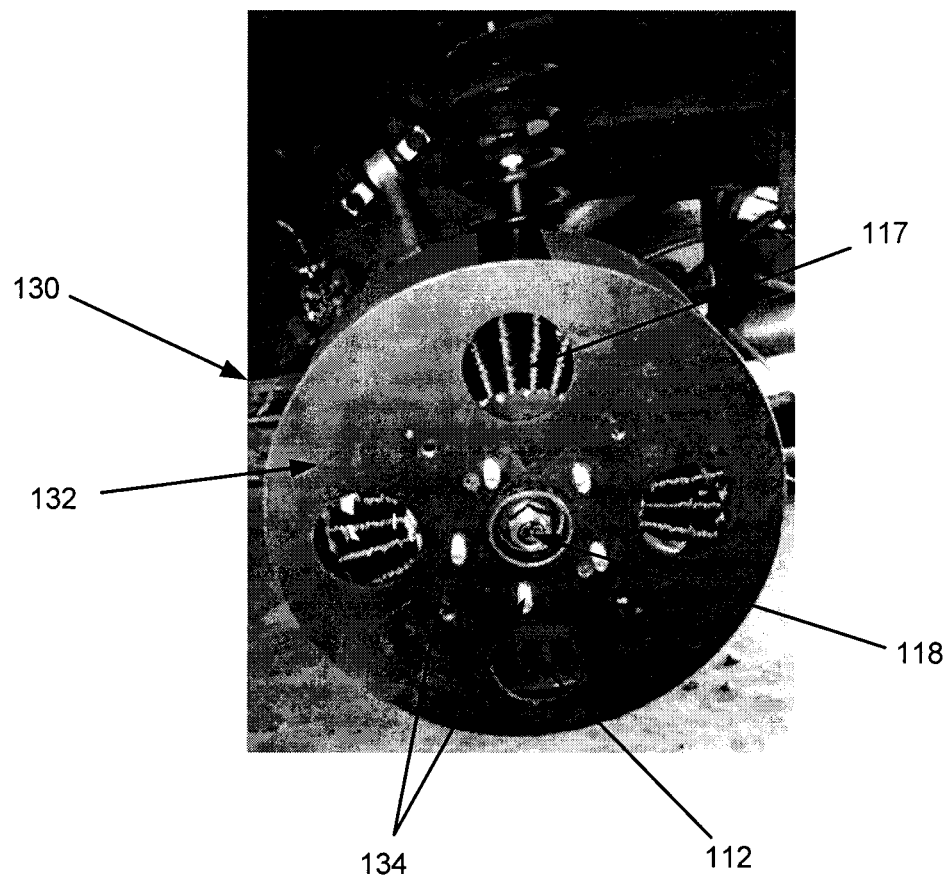
FIG. 3 illustrates an embodiment a wheel assembly provided as a drum which is attachable to the chassis of the vehicle on one side and to a standard wheel on the other side.

In another embodiment, the wheel assembly may be provided as a drum which is attachable to the chassis of the vehicle on one side and to a standard/existing wheel on the other side. An example of such arrangement is shown in FIG. 3. The embodiment of FIG. 3 may be provided as a kit for installing in vehicles while effecting minor modifications to the existing structure of the vehicle. FIG. 3 illustrates a wheel assembly 130 including a drum shaped wheel 132, and a stator 112 having a plurality of coils 117. The wheel 132 includes magnets on the inner side thereof (not shown in FIG. 3). The stator 112 is fixed to the chassis of the car. The rotor is embedded in the wheel 132 and is rotatably mounted to the shaft 118 using a bearing. The drum 132 includes a plurality of bolts 134 for attaching to a wheel (not shown), and one or more cutouts for cooling the coils 117 through ventilation.

Figure 4:
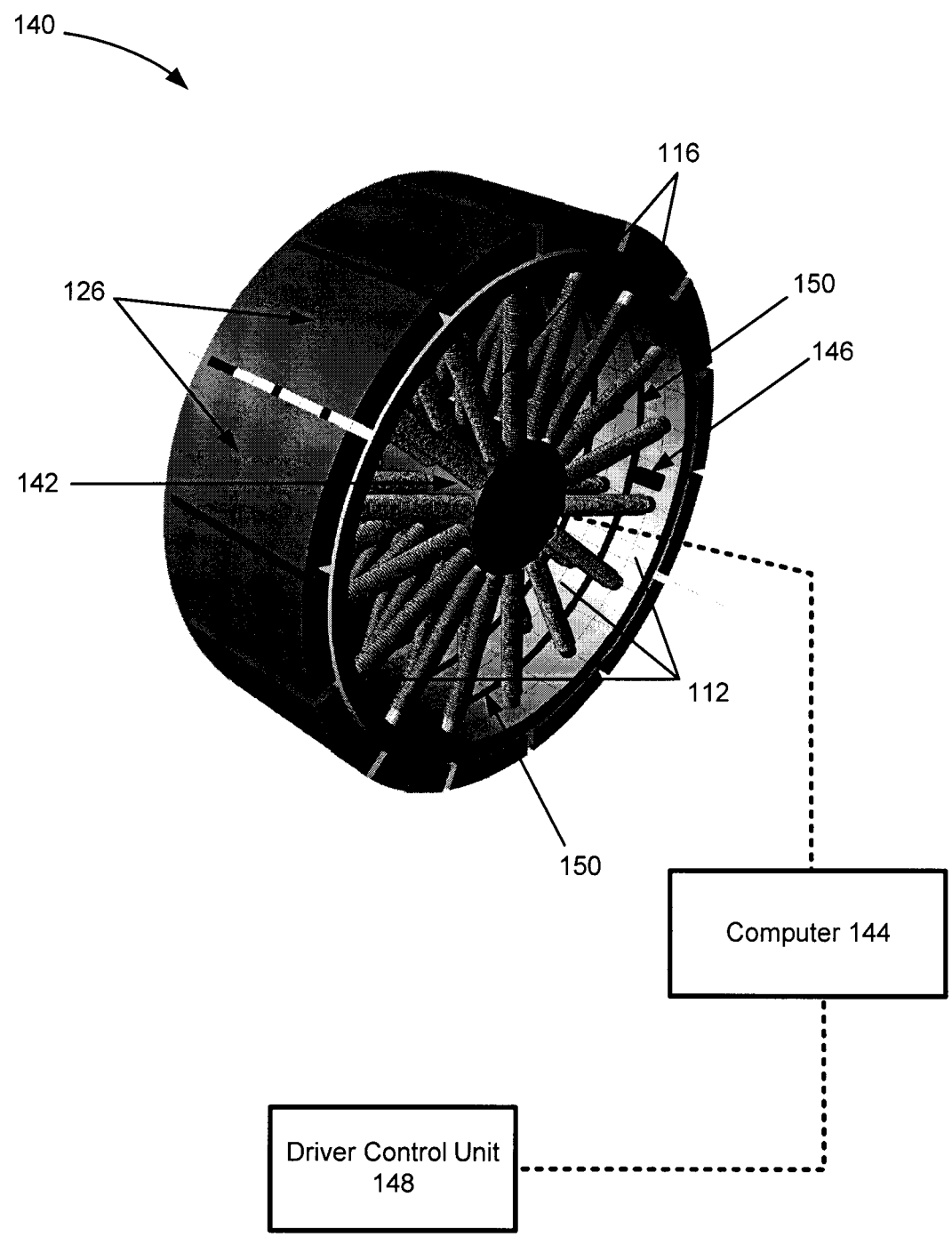
FIG. 4 illustrates a wheel assembly comprising a rotor and a plurality of stator units within the rotor, in accordance with another embodiment.
Figure 5:
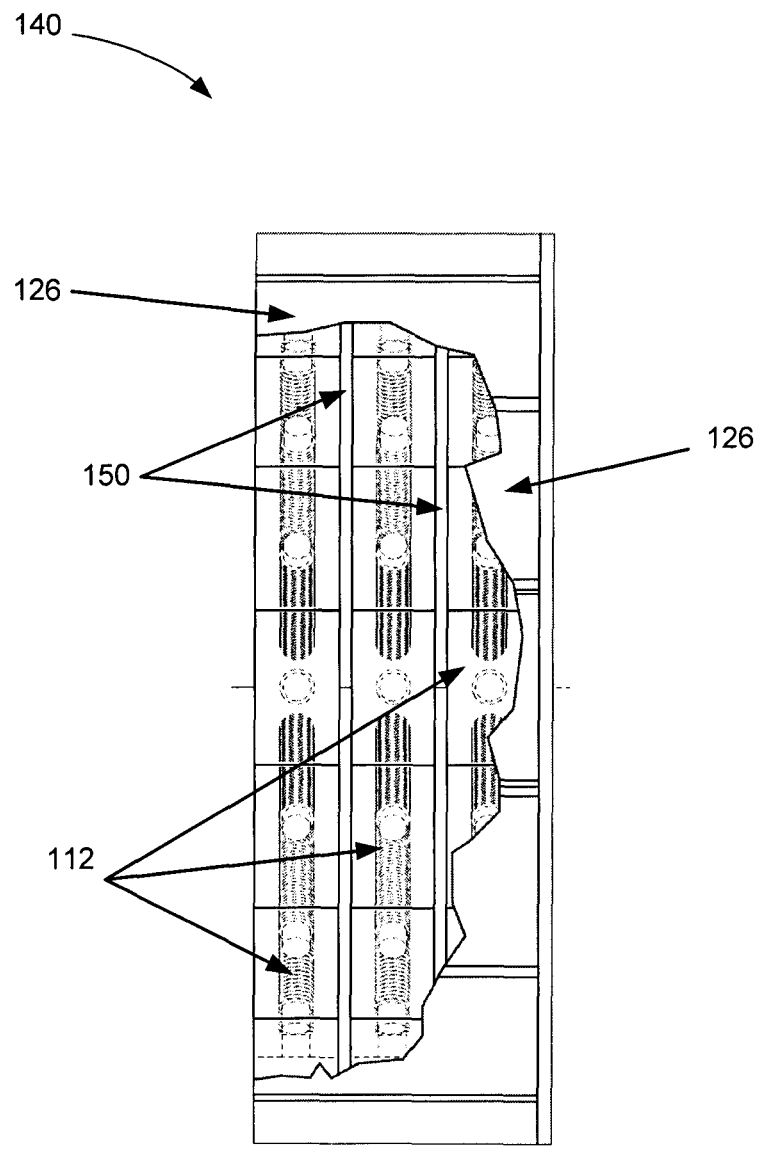
FIG. 5 is a top view of the wheel assembly of FIG. 4, showing the plurality of stator units underneath the magnets.

With prolonged use and/or harsh driving conditions the coils experience overheating which lessens their durability and increase the risk of fire or damage to the vehicle. The present embodiments offer a solution to this problem by providing a wheel assembly including a rotor and a plurality of stator units coaxially provided within the same rotor for selectively activating one or more stator units and deactivating other ones to cool them down. Such wheel assembly may also provide for higher torque by adding more stators in line when higher power is needed. FIG. 4 illustrates a wheel assembly comprising a rotor and a plurality of stator units within the rotor, in accordance with another embodiment, and FIG. 5 is a top view of the wheel assembly of FIG. 4, showing the plurality of stator units underneath the magnets.

As shown in FIG. 4, the wheel assembly 140 comprises a plurality of magnets 126 defining a rotor, and a plurality of stator units 112 provided coaxially within the rotor and attached to the same shaft 142. Needless to say, the width of the magnets 140 is chosen so as to encompass all the stator units 112, as shown in FIG. 4.

As described above, each stator unit 112 comprises a plurality of coils, each coil being provided around a spoke 116, wherein the spokes are provided around the rotation shaft. In the embodiment of FIG. 4, the stator units 112 are controlled separately, whereby it is possible to selectively activate one stator unit and deactivate the other to avoid overheating, or activate additional stator units to increase the power as the needs arise. Activation and de-activation of the stator units 112 may be done using a computer 144 and/or manually by the user using a driver control unit 148 when more power is needed.

The computer 144 may be adapted to periodically activate an idle stator unit 112 and deactivate a working one. In an embodiment, one or more heat sensors 146 are provided on each stator unit 112 (and or the rotor) to measure the temperature and send the sensor readings to the computer 144 to monitor the temperature and control the function of the stator units 112 based on real-time temperature data rather than periodically. The stator units may be spaced apart for increased cooling, as shown in FIGS. 4 and 5 (see spacing 150).

In an embodiment, the stator units may have different widths and different capacities. For example, in a wheel assembly having three stator units, it is possible that the middle stator unit has twice the width and power of the exterior stator units e.g. 25% for the exterior unit, 50% for the middle unit, and 25% for the interior unit.

While the embodiment discussed above describes the activation and deactivation of stator units, it is also possible to perform the activation and deactivation on the coil level whereby it is possible to activate one or more coils in one stator unit and activate other coils in another stator unit, then deactivate some or all of the activated coils and activate others in the same stator unit or in another stator unit within the same wheel assembly. In which case, each coil may be separately controlled by the computer 144 to activate and deactivate the coil when needed.

Figure 6:
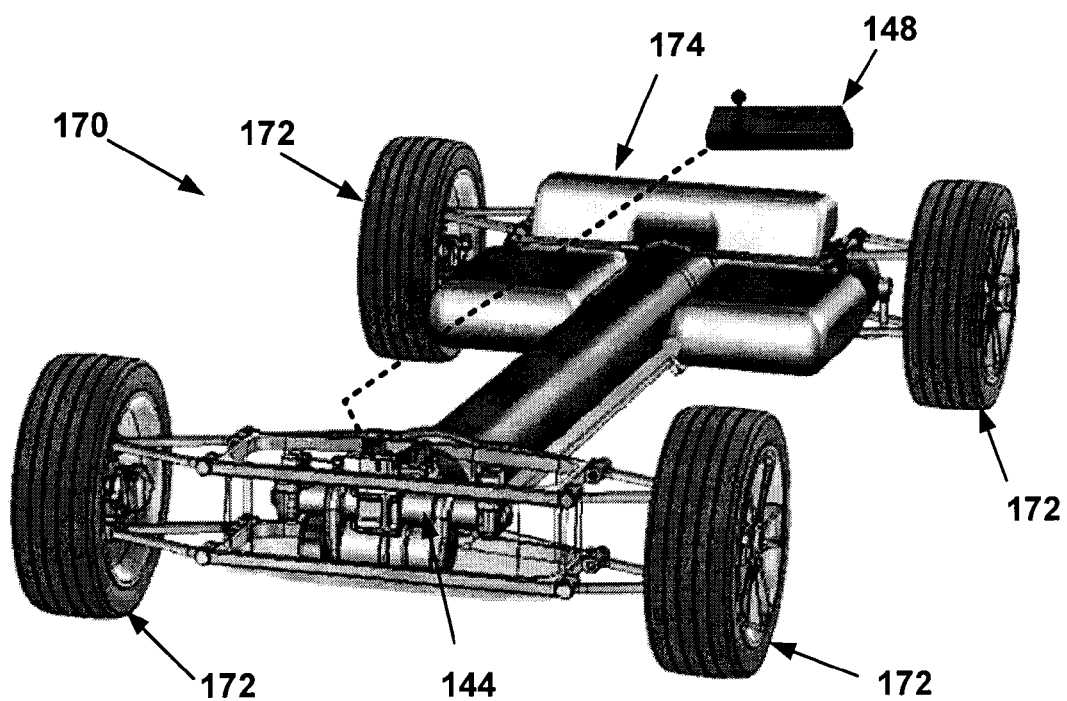
FIG. 6 illustrates an example of a vehicle including at least one wheel assembly in accordance with an embodiment.

FIG. 6 illustrates an example of a vehicle including at least one wheel assembly, in accordance with the present embodiments. As shown in FIG. 6, a vehicle 170 comprises a set of wheels 172. At least one of these wheels 172 comprising an electrical wheel assembly as described in the present embodiments. Preferably, all four wheels comprise the electrical wheel assembly described herein. In another embodiment, only the rear or front wheels are provided with the electrical wheel assembly described herein.

The vehicle 170 comprises an energy source 174 e.g. a battery, solar panel, generator mounted couple to a combustion engine etc. The battery may be charged by plugging into a power source in the wall or by a generator/break system/solar panel or the like on board of the vehicle 170 using known techniques. Examples of suitable batteries include lithium batteries, lithium air batteries, lithium-ion batteries, acid batteries, etc. The wheels 172 do not require a conventional transmission system to rotate, and may be individually controlled by a central computer 144 to accelerate and decelerate them by varying the current intensity/voltage fed by the battery based on control signals received from the driver using the driver control unit 148, and by activating and deactivating the stator units provided in each wheel to increase power and torque or to avoid overheating of one of the stator units 112.

A vehicle in accordance with the present embodiments does not require a transmission system, thus, the vehicle may be lightweight and may have a larger storage capacity.

In another embodiment, the wheels may be used for generating electricity. For example, the wheels 172 may be used for electromagnetic breaking by converting the kinetic energy of the car into an electric current which may be used for charging the battery of the car. When a wire or any other electrically conductive material moves across a magnetic field, an electric current occurs in the wire. In conventional generators, electricity is generated by the movement of a coil between the poles of a magnet. By contrast, in the present embodiment, the coil of the stator 112 remains static and magnets 126 of the rotor 114 turn around the coils causing electrons to flow in the coils creating an electrical current.

Figure 7:
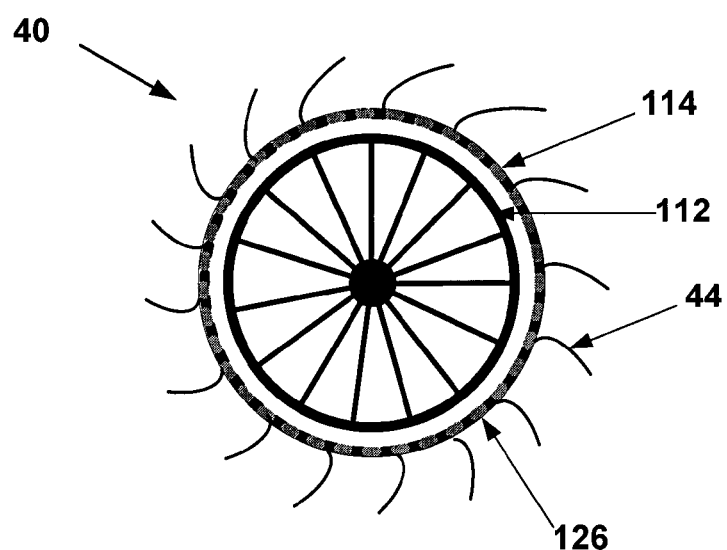
FIG. 7 illustrates an embodiment a hydro-electric turbine in accordance with an embodiment.

It should be noted that use of the wheel assemblies 110 and 140 for the generation of electricity is not limited to vehicles. The wheel assembly may also be used in hydro-electric turbines, and wind turbines for generating energy from renewable sources. An example of a hydro-electric turbine is shown in FIG. 7. As shown in FIG. 7, the hydroelectric turbine 40 comprises a wheel assembly as described above, and a plurality of blades 44 provided on the outer surface of the wheel assembly for receiving the flow of water and rotating the rotor 114 around the stator 112 of the turbine 40, thus creating a flow of electron in the coils and generating an electric current.

The wheel assembly may be used in a variety of different applications including but not limited to windmills, electric pumps, cars, motorcycles etc.

When using the wheel assembly 140 of FIG. 4 for the generation of electricity, it is possible to collect the electric current from the wiring of a first stator unit and then switch to a second stator unit to avoid overheating the first stator unit with prolonged use. The same principle applies to coils whereby it is possible to collect electric current from selected coils in one or more stator units and then switch to other coils to avoid overheating in the coils.

Figure 8:
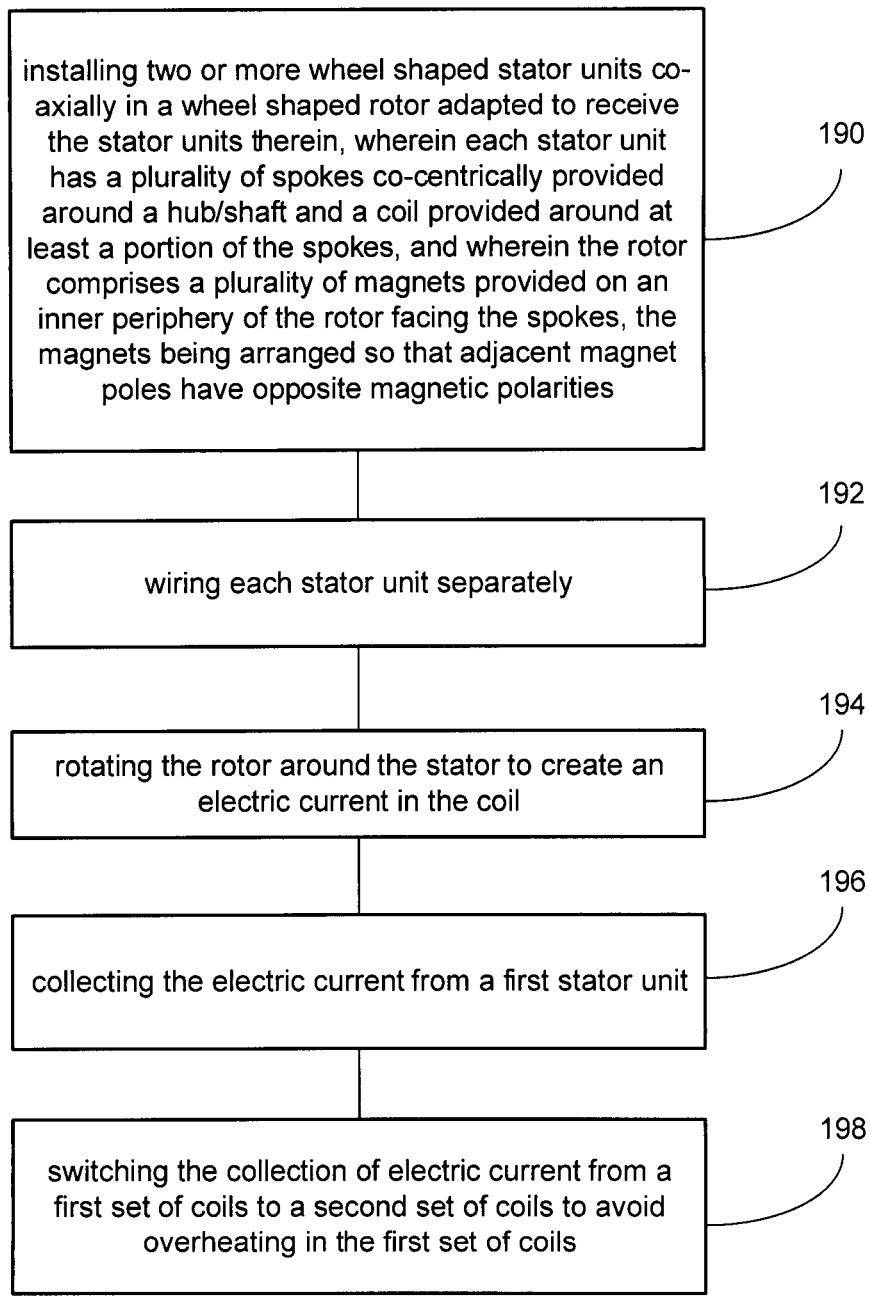
FIG. 8 is a flowchart of a method for generating electricity using a vehicle assembly in accordance with the embodiment of FIG. 4.

FIG. 8 is a flowchart of a method for generating electricity using a vehicle assembly in accordance with the embodiment of FIG. 4. As shown in FIG. 8, step 190 comprises 18. A method for generating electricity, the method comprises installing two or more wheel shaped stator units co-axially in a wheel shaped rotor adapted to receive the stator units therein, wherein each stator unit has a plurality of spokes co-centrically provided around a hub/shaft and a coil provided around at least a portion of the spokes, and wherein the rotor comprises a plurality of magnets provided on an inner periphery of the rotor facing the spokes, the magnets being arranged so that adjacent magnet poles have opposite magnetic polarities. Step 192 comprises wiring each stator unit separately. Step 194 comprises rotating the rotor around the stator to create an electric current in the coil. Step 196 comprises collecting the electric current from a first stator unit. Step 198 comprises switching the collection of electric current from a first set of coils to a second set of coils to avoid overheating in the first set of coils.

While preferred embodiments have been described above and illustrated in the accompanying drawings, it will be evident to those skilled in the art that modifications may be made without departing from this disclosure. Such modifications are considered as possible variants comprised in the scope of the disclosure.

The invention claimed is:

1. A vehicle comprising:
 a chassis;
 a power source;
 at least one wheel assembly defining a motor, the wheel assembly being attached to the chassis and comprising:
 two or more wheel shaped stator units, each stator unit having a plurality of spokes co-centrically provided around a hub/shaft, the hub/shaft being attached to the chassis of the vehicle;
 a coil wrapped around at least some of the spokes for generating a magnetic field;
 a wheel shaped rotor adapted to receive the stator units therein, the rotor being rotatably attached to the hub/shaft and comprising a plurality of magnets provided on an inner periphery of the rotor facing the spokes, wherein the magnets are arranged so that adjacent magnet poles have opposite magnetic polarities; wherein interaction between magnetic fields generated by the coils and magnetic fields generated by the magnets cause the rotor to rotate around the stator
 a driver control unit for receiving driving commands;
 a computer operably connected to the driver control unit for controlling operation of the coils and an intensity of an electric current fed into the coils from the power source in accordance with the driving commands,
 wherein the coils of each stator unit are activated or deactivated to avoid overheating.

2. The vehicle of claim 1, wherein the coils are controlled on a stator unit level, whereby all coils of the same stator unit are activated or deactivated simultaneously to avoid overheating.

3. The vehicle of claim 1, wherein each coil is controlled separately, whereby selected coils of different stator units operate at the same time to avoid overheating.

4. The vehicle of claim 1, wherein a space exists between adjacent stator units.

5. The vehicle of claim 1, wherein the stator units have different magnetic capacities.

6. The vehicle of claim 1, wherein the power source includes one or more of: a battery, a solar panel, and a generator connected to a combustion engine.

7. The vehicle of claim 1, wherein a spacing exists between the stator and the magnets of the rotor.

8. The vehicle of claim 1, wherein the magnets are permanent magnets.

9. The vehicle of claim 1, wherein the magnets are made of rare earth materials.

10. The vehicle of claim 1, wherein the magnets include neodymium magnets.

11. The vehicle of claim 1, further comprising heat sensors provided on one or more of the stator units and connected to the computer for sensing temperature of the stator units, wherein the computer is adapted to activate idle coils and deactivate activated coils using data received from the heat sensors.

12. A wheel assembly for connecting to a vehicle, the wheel assembly comprising:
 two or more wheel shaped stator units, each stator unit having a plurality of spokes co-centrically provided around a hub/shaft, the hub/shaft for attaching to a chassis of the vehicle;
 a coil wrapped around at least some of the spokes for generating a magnetic field in response to an electric current fed in the coil;
 a wheel shaped rotor adapted to receive the stator units therein, the rotor being rotatably attached to the hub/shaft and comprising a plurality of magnets provided on an inner periphery of the rotor facing the spokes, wherein the magnets are arranged so that adjacent magnet poles have opposite magnetic polarities, whereby magnetic fields generated by the coils and magnetic fields generated by the magnets cause the rotor to rotate around the stator;
 a heat sensor provided on one or more of the stator units for sensing temperature of the stator units and sending sensor reading data to a computer;

wherein the coils of each stator unit are activated or deactivated based on the sensor reading data generated by the heat sensor to avoid overheating.

13. The wheel assembly of claim 12, wherein the coils in a single stator unit are wired together so that the coils are activated or deactivated simultaneously.

14. The wheel assembly of claim 12, wherein each coil has a separate wiring whereby selected coils of different stator units may operate at the same time.

15. The wheel assembly of claim 12, wherein a space exists between adjacent stator units.

16. The wheel assembly of claim 12, wherein the stator units have different magnetic capacities.

17. The wheel assembly of claim 12, wherein a space exists between the stator and the magnets of the rotor.

18. The wheel assembly of claim 12, wherein the magnets include one of: permanent magnets, rare earth magnets, and neodymium magnets.

19. A method for generating electricity, the method comprising:

installing two or more wheel shaped stator units co-axially in a wheel shaped rotor adapted to receive the stator units therein, wherein each stator unit has a plurality of spokes co-centrically provided around a hub/shaft and a plurality of coils provided around at least a portion of the spokes, and wherein the rotor comprises a plurality of magnets provided on an inner periphery of the rotor facing the spokes, the magnets being arranged so that adjacent magnet poles have opposite magnetic polarities;

rotating the rotor around the stator to create an electric current in the coils;

collecting the electric current from a first set of coils of a first stator unit;

switching the collection of electric current from the first set of coils to a second set of coils of a second stator unit to avoid overheating in the first set of coils.

20. The method of claim 19, further comprising sensing temperature of the stator units for performing the switching.

\* \* \* \* \*